United States Patent
Shukh et al.

(10) Patent No.: US 7,609,480 B2
(45) Date of Patent: Oct. 27, 2009

(54) HEAT-ASSISTED MAGNETIC RECORDING HEAD

(75) Inventors: Alexander Mikhailovich Shukh, Savage, MN (US); Alexandre Vasilievich Demtchouk, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 495 days.

(21) Appl. No.: 11/480,054

(22) Filed: Jun. 30, 2006

(65) Prior Publication Data

US 2008/0013912 A1    Jan. 17, 2008

(51) Int. Cl.
G11B 5/127    (2006.01)
(52) U.S. Cl. ................ 360/125.74; 369/13.14
(58) Field of Classification Search .......... 360/59, 360/75, 125.31, 125.74, 128
See application file for complete search history.

(56) References Cited

U.S. PATENT DOCUMENTS

| | | | |
|---|---|---|---|
| 6,064,783 A | 5/2000 | Congdon et al. ............ 385/15 |
| 6,236,773 B1 | 5/2001 | Butler et al. ............... 385/14 |
| 6,636,460 B2 * | 10/2003 | Akiyama et al. ........ 369/13.14 |
| 6,930,975 B2 * | 8/2005 | Tawa et al. ............. 369/112.28 |
| 6,963,530 B1 | 11/2005 | Thornton et al. ........... 369/121 |
| 7,412,143 B2 * | 8/2008 | Rottmayer et al. .......... 385/129 |
| 2001/0021211 A1 | 9/2001 | Ueyanagi .................... 372/46 |
| 2001/0040868 A1 | 11/2001 | Ueyanagi et al. ........... 369/300 |
| 2002/0167870 A1 | 11/2002 | Akiyama et al. ......... 369/13.33 |
| 2002/0196997 A1 | 12/2002 | Chakravorty et al. ......... 385/14 |
| 2003/0007442 A1 | 1/2003 | Henrichs .................... 369/95 |
| 2003/0128452 A1 * | 7/2003 | McDaniel et al. ........... 360/59 |
| 2003/0128633 A1 | 7/2003 | Batra et al. ............. 369/13.32 |
| 2003/0128634 A1 | 7/2003 | Challener .............. 369/13.33 |
| 2003/0137772 A1 | 7/2003 | Challener ................. 360/131 |
| 2003/0161245 A1 | 8/2003 | Henrichs .................... 369/95 |
| 2003/0235121 A1 | 12/2003 | Eppler .................... 369/13.24 |
| 2004/0001394 A1 | 1/2004 | Challener et al. ........ 369/13.32 |
| 2004/0001420 A1 | 1/2004 | Challener ............. 369/112.27 |
| 2004/0008591 A1 | 1/2004 | Johns et al. ............. 369/13.14 |
| 2004/0062503 A1 | 4/2004 | Challener ................. 385/129 |
| 2005/0018547 A1 | 1/2005 | Akiyama et al. ......... 369/13.02 |
| 2005/0111129 A1 | 5/2005 | Crawford et al. ............ 360/68 |
| 2005/0122849 A1 | 6/2005 | Ueyanagi ............... 369/13.02 |
| 2005/0190682 A1 | 9/2005 | Gage et al. ............ 369/112.29 |
| 2005/0289577 A1 | 12/2005 | Seigler et al. ............. 720/658 |
| 2007/0230048 A1 * | 10/2007 | Hasegawa .................. 360/126 |

FOREIGN PATENT DOCUMENTS

JP    2003-045004    *    2/2003

* cited by examiner

*Primary Examiner*—Angel A. Castro
(74) *Attorney, Agent, or Firm*—Westman, Champlin & Kelly, P.A.

(57) ABSTRACT

An apparatus, comprising a slider. The slider includes a substrate with an air bearing surface and a trailing substrate side. The slider includes an optoelectronic heater and a magnetic head being mounted on the trailing substrate side. Thermal insulation is interposed between the optoelectronic heater and the magnetic head. The optoelectronic heater is thermally coupled to the trailing substrate side.

21 Claims, 5 Drawing Sheets

HEAT-ASSISTED MAGNETIC RECORDING HEAD

FIELD OF THE INVENTION

The present invention relates generally to data storage apparatus, and more particularly but not by limitation to heat assisted magnetic recording (HAMR) heads.

BACKGROUND OF THE INVENTION

There are conflicting design needs in improving performance of HAMR heads. There is a design need for a fast access time which requires enhanced control characteristics such as high speed, low overshoot positioning speed during seeking, and precise position controllability (during tracking) with a low expenditure of electrical power for position control in both modes. Enhanced control characteristics drive a design toward reducing moving mass and reducing mechanical and aerodynamic drag on the HAMR head and its suspension.

There is a design need to deliver high levels of optical radiation to the HAMR head in order to provide rapid heating of magnetic media. Various known solutions for coupling high levels of optical radiation to the HAMR head lead to arrangements that adversely affect control characteristics.

Increased mass and aerodynamic drag due to large optical source structures mounted on the HAMR head and/or head suspension and pivoting arm slow down movement of the HAMR head and lead to either increased access time or unacceptably high electrical power consumption for position control. In addition, some optical source structures that are mounted to HAMR heads can overheat magnetic reading or writing components on the head.

When optical source structures are remotely mounted in a non-moving location, optical transmission media (such as lenses, mirrors or optical fibers) coupled between the optical source and the HAMR head add moving mass or a difficult-to-predict variable component of mechanical resistance to motion that leads to either increased access time or unacceptably high levels of electrical power consumption.

A HAMR arrangement is needed that will provide an enhanced combination of low power consumption, freedom from overheating of magnetic components and fast access time.

Embodiments of the present invention provide solutions to these and other problems, and offer other advantages over the prior art.

SUMMARY OF THE INVENTION

Disclosed is an apparatus, comprising a slider. The slider includes a substrate with an air bearing surface and a trailing substrate side. The slider includes an optoelectronic heater and a magnetic head being mounted on the trailing substrate side. Thermal insulation is interposed between the optoelectronic heater and the magnetic head. The optoelectronic heater is thermally coupled to the trailing substrate side.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, an optoelectronic heater for a HAMR head is disposed on a trailing side of a slider substrate. A magnetic head, including a writer and a reader, is also disposed on the trailing side to form the HAMR head. Only electric inputs are needed for energizing the heater, writer and reader, and there is no need for any optical power input to the head. The HAMR head is free of connections to fiber optic cables, external mirrors or other optical connections or masses that could degrade the dynamic mechanical performance of the head. A buffer layer with high thermal conductance (low thermal resistance) is provided between the heater and the slider. The heater is effectively heat sunk to the slider through the buffer layer. One or more spacer layers with low thermal conductance (high thermal resistance) thermally isolate the reader and writer from the heater. The thermal conductance of the buffer layer is higher than the thermal conductance of the spacer layers. The reader and writer temperatures are kept in a safe range. The optoelectronic heater and the magnetic head function as thermal nodes whose temperatures are controllable by the thermal resistances of the buffer layer and the spacer layers. The embodiments provide a low mass source of heater radiation that does not inhibit dynamic motion of the slider.

Figure 1:
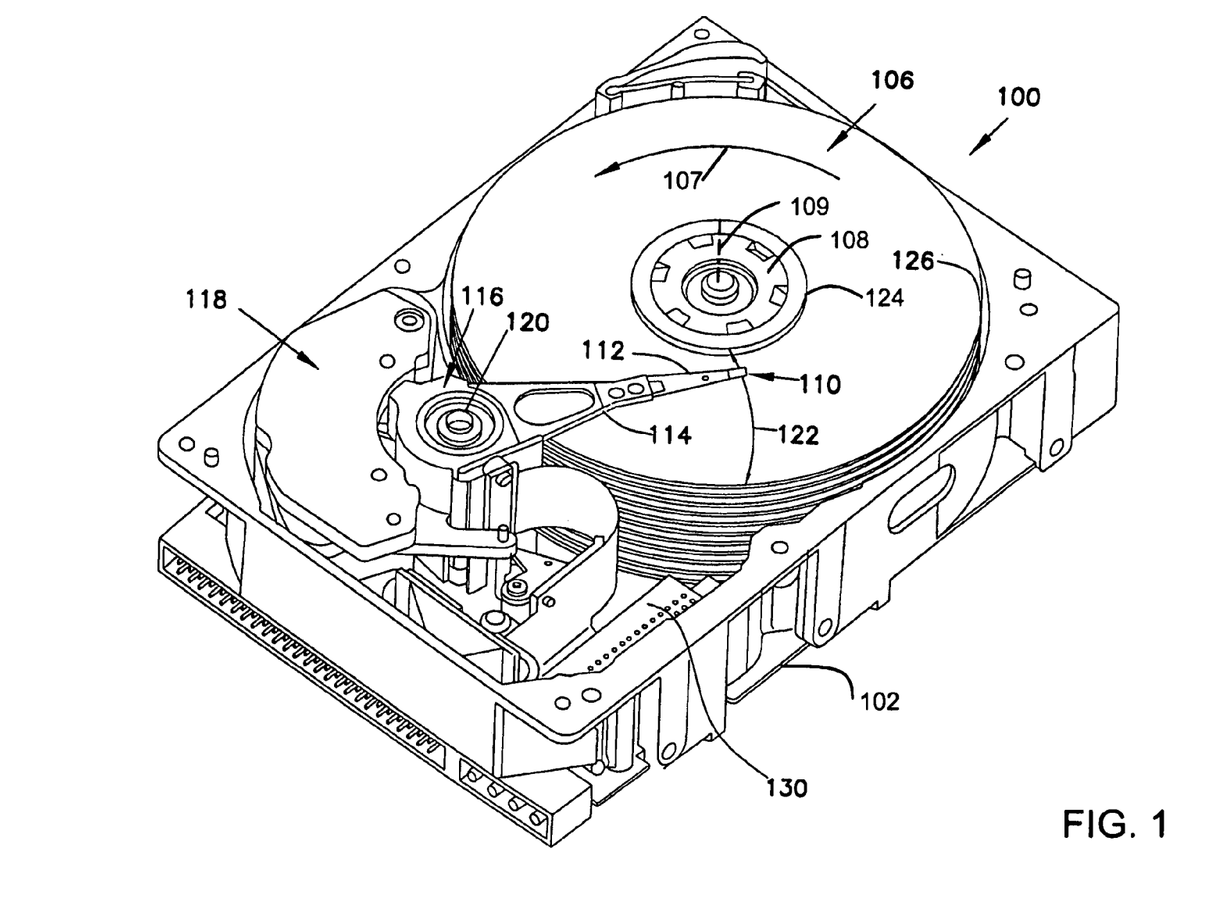
FIG. 1 is an isometric view of a disc drive.

FIG. 1 illustrates an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc slider 110, which is mounted to disc drive 100 for communication with the disc surface. In one embodiment, the slider 110 comprises a giant magnetoresistance (GMR) recording head. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write (recording) heads 110 over a desired data track along an arcuate path 122 between a disc inner diameter 124 and a disc outer diameter 126. Voice coil motor 118 is driven by electronics 130 based on signals generated by read/write (recording) heads 110 and a host computer (not shown). The individual discs in the disc pack 106 are formatted with an array of data storage cells for storing data. The read/write (recording) head slider 110 comprises a HAMR head that is described in more detail below by way of examples illustrated in FIGS. 2-5.

Figure 2:
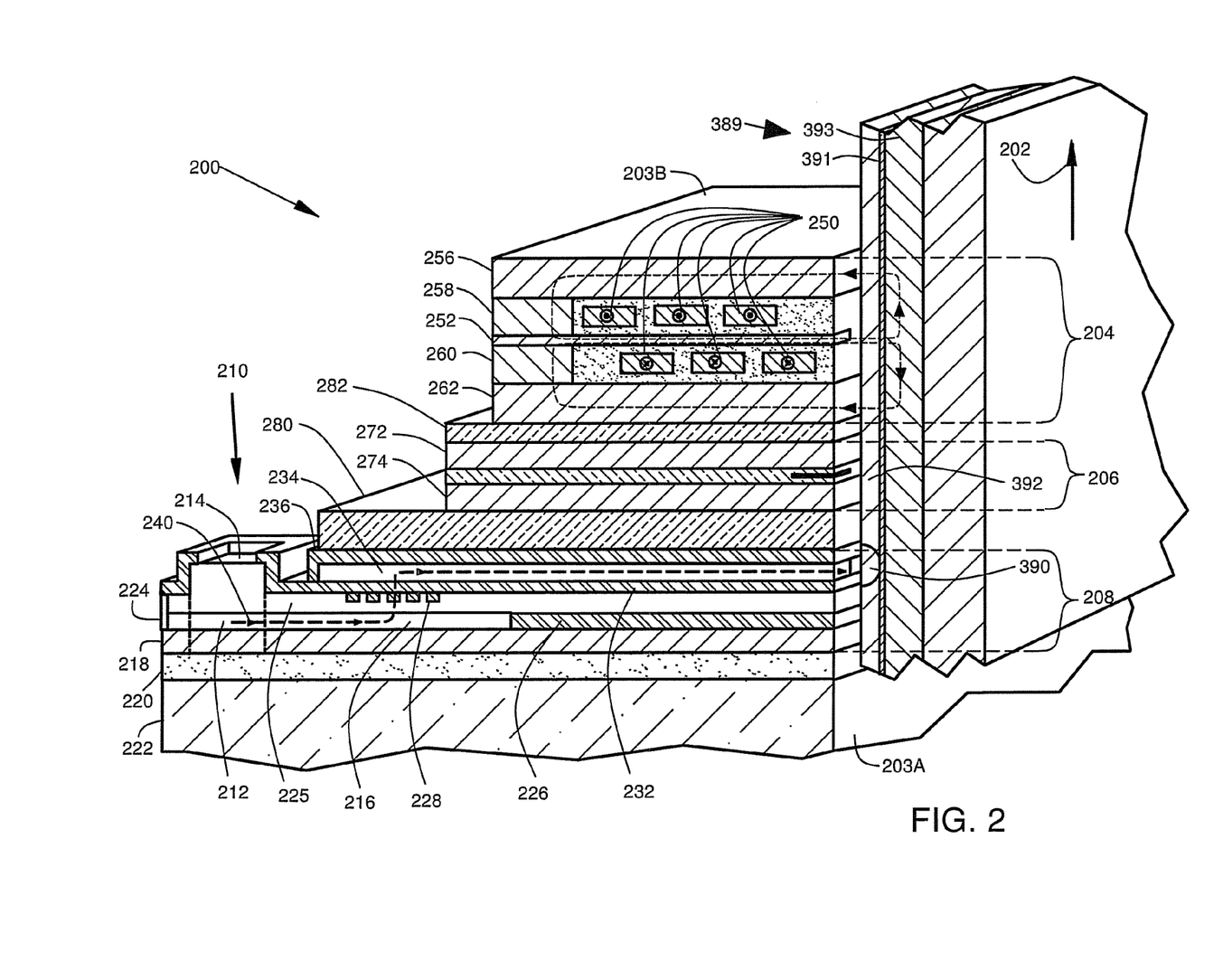
FIG. 2 illustrates an oblique view of a first embodiment of a HAMR head flying over magnetic media.
Figure 3:
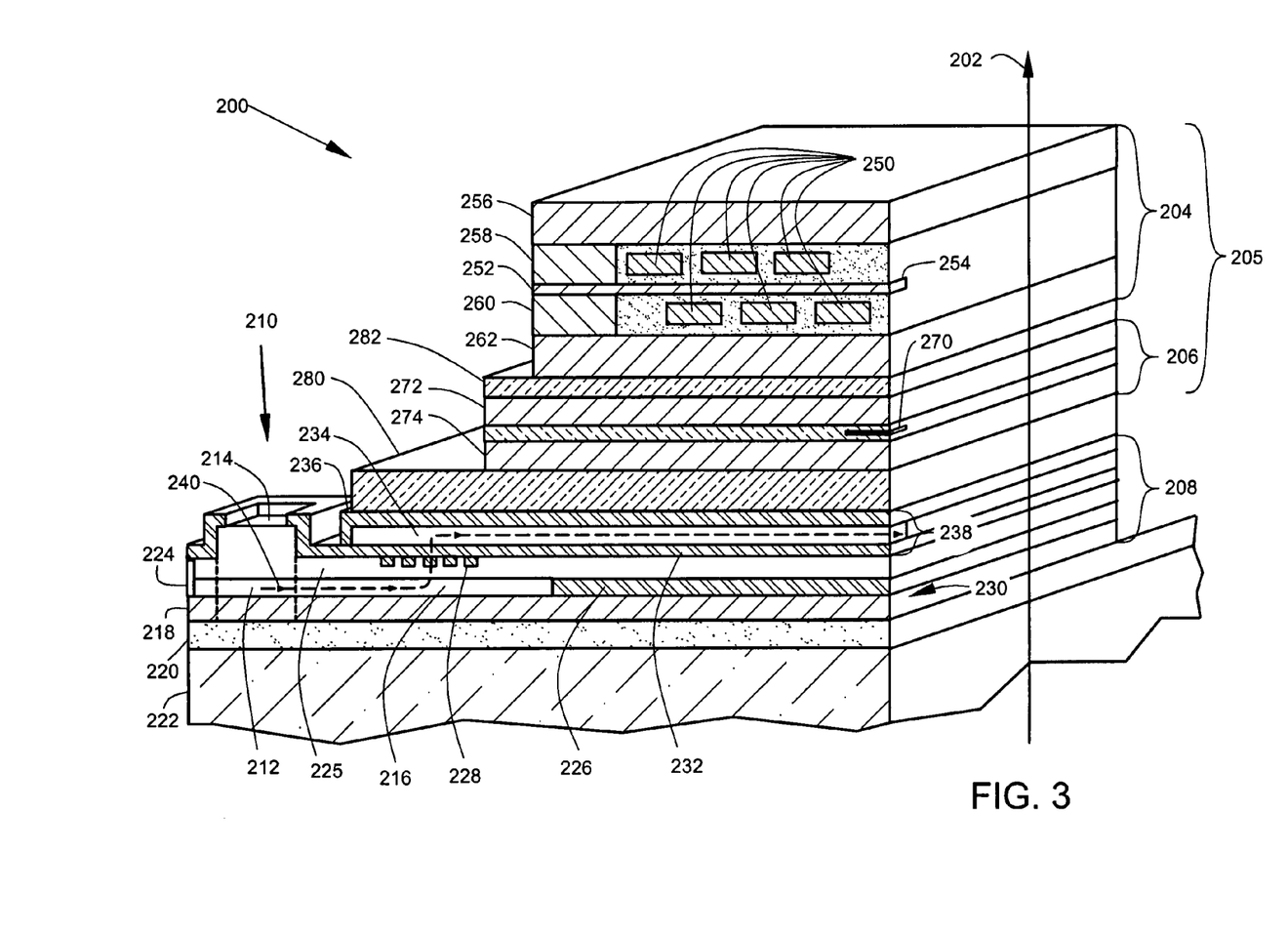
FIG. 3 illustrates an oblique view, cross-sectioned along a central plane, of the first embodiment of a HAMR head.

FIGS. 2-3 illustrate oblique views, cross-sectioned along a central plane, of a first embodiment of a HAMR head 200. FIG. 2 illustrates the head 200 flying over a perpendicular magnetic medium 389. The perpendicular magnetic medium 389 moves in a direction 202 past the HAMR head 200, thus, in accordance with convention, the HAMR head 200 includes a leading side 203A and a trailing side 203B relative to the moving medium 389 in the direction 202. The perpendicular magnetic medium 389 includes a storage layer 392, a non-magnetic interlayer 391, and a soft magnetic underlayer 393. The storage layer 392 includes a heated region 390 that is heated by radiation produced by the head 200.

Generally, the HAMR head 200 includes writer portion 204 (also called writer 204), reader portion 206 (also called reader 206) and optoelectronic heater 208 that are stacked. The writer portion 204 and the reader portion 206, taken together, comprise read/write magnetic head 205. The stacking order of the writer 204 and the reader 206 can vary from that shown, but the optoelectronic heater 208 is stacked upstream of both the writer portion 204 and the reader portion 206. The optoelectronic heater 208 is stacked upstream from the magnetic transducer 205.

The optoelectronic heater 208 (also called optoelectronics heater layers 208) includes a laser 210. The laser 210 comprises an active region 212 under a laser anode 214, and an associated laser wave-guide core layer 216 beyond the region under the laser anode 214. The laser anode 214 is made of a p-type material. A laser cathode 218 comprises an n-type material. The laser anode 214 and the laser cathode 218 are deposited on opposite sides of the laser active region 212. The laser active region 212 generates laser radiation 240.

The laser cathode 218 is disposed adjacent a buffer layer 220. The buffer layer 220 is disposed adjacent a slider substrate 929. The slider substrate 222 supports the optoelectronics heater 208. The buffer layer 220 electrically insulates the laser cathode 218 from the slider substrate 222. The buffer layer 220 is typically formed of aluminum dioxide ($Al_2O_3$) or nitrides (AlN), oxides and carbides of aluminum, magnesium, silicon and their alloys, for instance, SiC, MgO, AlMgO, or AlMgN or similar materials. The buffer layer 220 has a thickness in a range from 10 nm up to several microns, and more preferably in the range from 100 nm to 300 nm to provide a high thermal conductance between the optoelectronic heater 208 and the substrate 222.

The laser 210 includes a reflector 224 in the form of a mirror on a back side of the core layer 216 and a back side of a laser cladding layer 225. Electrical current flows through the laser 210, which is a diode in this embodiment, and generates electron/hole recombination in the active region 212, which releases energy as photons. The laser core layer 216 and the cladding layer 225 extend beyond the active region 212. An absorber layer 226 is disposed adjacent the laser core layer 216. An optical grating 228 extends partially into the cladding layer 225. The cladding layer 225, the core layer 216 and the cathode layer 218, taken together, comprise an optical waveguide 230. The waveguide 230 confines propagation of generated photons from the active region 212 to the high index of refraction region of the laser waveguide core layer 216.

The optical grating 228 is disposed adjacent the anode 214 on the side thereof remote from the mirror 224. A silicon dioxide layer ($SiO_2$) 232 extends over the grating 228. Laser light having a wavelength as determined by the periodic spacing of the optical grating 228 passes through the optical grating 228 to a core layer 234 that preferably comprises phosphosilicate glass (PSG). The core layer 234 is doped with a selected element (for instance, phosphorus, etc.) that provides a high index of refraction. A silicon dioxide cladding layer 236 covers the PSG core layer 234. The $SiO_2$ cladding layer 232, glass core layer 234 and cladding layer 236 form a dielectric planar wave-guide layer 238. The cladding layer 232 can be also made of $SiO_xN_y$, $Si_3N_4$, $Ta_2O_5$, $HfO_2$, $ZrO_2$, $TiO_2$ or similar materials. Laser light travels generally along a dashed line path 240 and through an air bearing surface toward the moving magnetic media 389 (also shown in FIG. 4) where it is absorbed by and heats a small area 390 of the storage layer 392 of the magnetic media 389 before the media moves under the writer portion 204. It will be understood by those skilled in the art that, alternatively, waveguides shaped differently than those shown, or additional waveguides, can be used to carry the light to a location that is closer to the writer.

An electric write current in a coil 250 generates a magnetic field that magnetizes a main pole 252. The field has a maximal strength in a pole tip 254 exposed at the ABS due to its reduced sectional area. This field is sufficient to reverse an orientation of magnetization (write a bit of data) in the heated area 390 of the storage layer 392 when this heated area 390 passes in front of the pole tip 254 at a later time. Return poles 256 and 262 along with back vias 258 and 260 comprise soft magnetic material and provide a low reluctance path for the write magnetic field.

The reader layers 206 include a magnetoresistive element 270 and soft magnetic shields 272, 274. A spacer layer 280 is disposed between the reader 206 and the optoelectronic heater 208. The spacer layer 280 comprises a thermal insulation material such as aluminum dioxide or $SiO_2$, SiOCH, amorphous carbon or similar materials. The material and thickness of spacer layer 280 is selected to provide a lower thermal conductance in comparison with the thermal conductance of the buffer layer 220. The spacer layer 280 has a thickness of 5-10 times the thickness of the buffer layer 220 to limit heat flow from the optoelectronic layers 208 to the reader 206. The spacer layer 280 preferably has a thickness of more than 500 nm.

A spacer layer 282 is disposed between the reader 206 and the writer 204. The spacer layer 282 comprises a non-magnetic conductive or insulative materials such as NiP-alloy, $Al_2O_3$, $SiO_2$ or similar materials or their combination. The material and thickness of spacer layer 282 is selected to provide a magnetic separation between the top reader shield 272 and bottom return pole 262 of the writer 204. The spacer layer 282 has a thickness in a range from 10 nm to 5 micron and more preferably, between 50 and 300 nm.

The spacer layers 280 provides thermal isolation of the magnetic head (transducer) 205 from the optoelectronic heater 208 by limiting heat flow. The substrate 222 functions as a heat sink for the optoelectronic heater 208. In one embodiment, as the optoelectronic heater 208, the reader 206 and the writer 204 are stacked up, the cross sectional area of the layers are selected to be successively smaller areas in the downstream direction along flow path arrow 202. The successive narrowing increases heat dissipation to the environment of layers further upstream, and reduces the temperatures of the layers that are further downstream.

Figure 4:
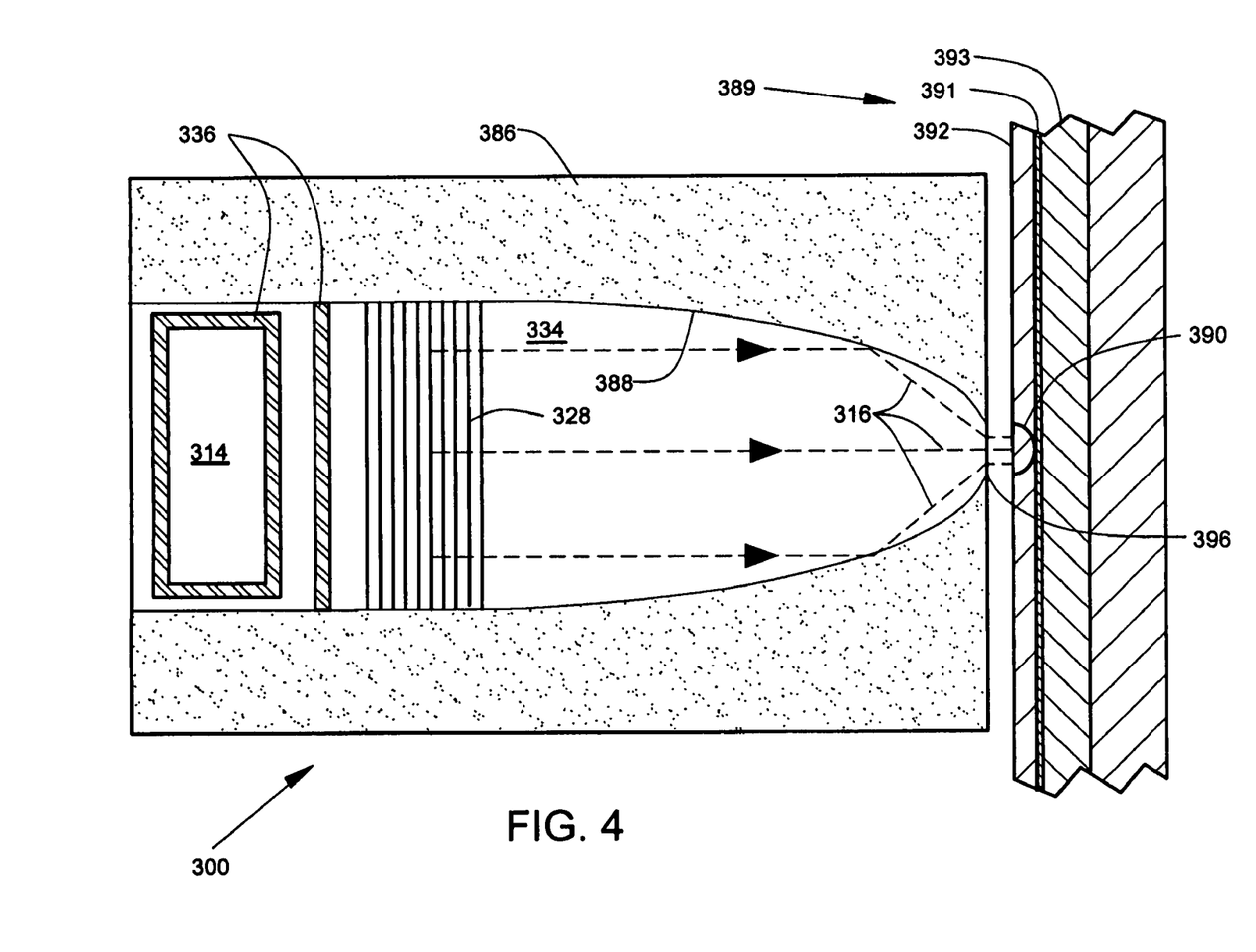
FIG. 4 illustrates a cross-sectional view of an embodiment of a waveguide layer in a HAMR head.

FIG. 4 illustrates a cross sectional view of an example of a waveguide layer 300 that can be used in a HAMR head. The cross sectional view shown in FIG. 4 is in a central plane of a core layer that corresponds generally with core layer 234 in FIGS. 2-3.

The waveguide layer 300 includes a core layer 334 and a cladding layer 386. The cladding layer 386 and the core layer 334 are adjacent one another along a parabolic interface 388 that has a generally parabolic shape that is truncated by an optical exit aperture 396 adjacent an air bearing surface (ABS). The term "air bearing surface", as used in this application, refers to an aerodynamic bearing surface that interacts with either air or another fill gas that fills the disc drive. The interface 388 is reflective and reflects light 316 that is propagating in the core layer 334. In one embodiment, the reflectivity of the interface 338 can be provided by a difference of optical index of refraction between the materials of the core layer 334 and the cladding layer 386, with the core layer 334 having a higher optical index of refraction than that of the cladding layer 386. In another embodiment, the reflectivity of the parabolic interface 388 can be provided by a metallic mirror layer at the parabolic interface 388.

A laser anode 314 (comparable to laser anode 214 in FIGS. 2-3) is visible in the cross sectional view in FIG. 4. Portions of a cladding layer 336 (comparable to cladding layer 226 in FIGS. 2-3) are visible in the cross sectional view in FIG. 4. The laser radiation 316 enters the core layer 334 from an optical grating 328 (comparable to optical grating 228 in FIGS. 2-3). Portions of the laser radiation 316 reflect from the parabolic interface 388 and are focused or concentrated at the optical exit aperture 396 at a truncated end of the parabolic interface 388. The laser radiation 316 at the exit aperture 396 has an increased power density relative to the power density of the laser radiation emanating from the optical grating 328 due to focussing provided by reflections from the parabolic interface 388. The laser radiation 316 exiting the optical exit aperture 396 is absorbed by a storage layer 392 on moving magnetic media 389. A heated region 390 is heated by the laser radiation 316. The movement of magnetic media 389 is generally along a line perpendicular to the page in FIG. 4. The laser radiation 316 locally and temporarily heats the heated region 390 of the storage layer 392 so that data can be written in the storage layer as the heated region 390 passes under a write head (not illustrated in FIG. 4) that is downstream from the optical exit aperture 396. After writing, the heated region 390 cools such that the media is less susceptible to flipping of stored bits of data due to thermal noise and stray magnetic fields.

Figure 5:
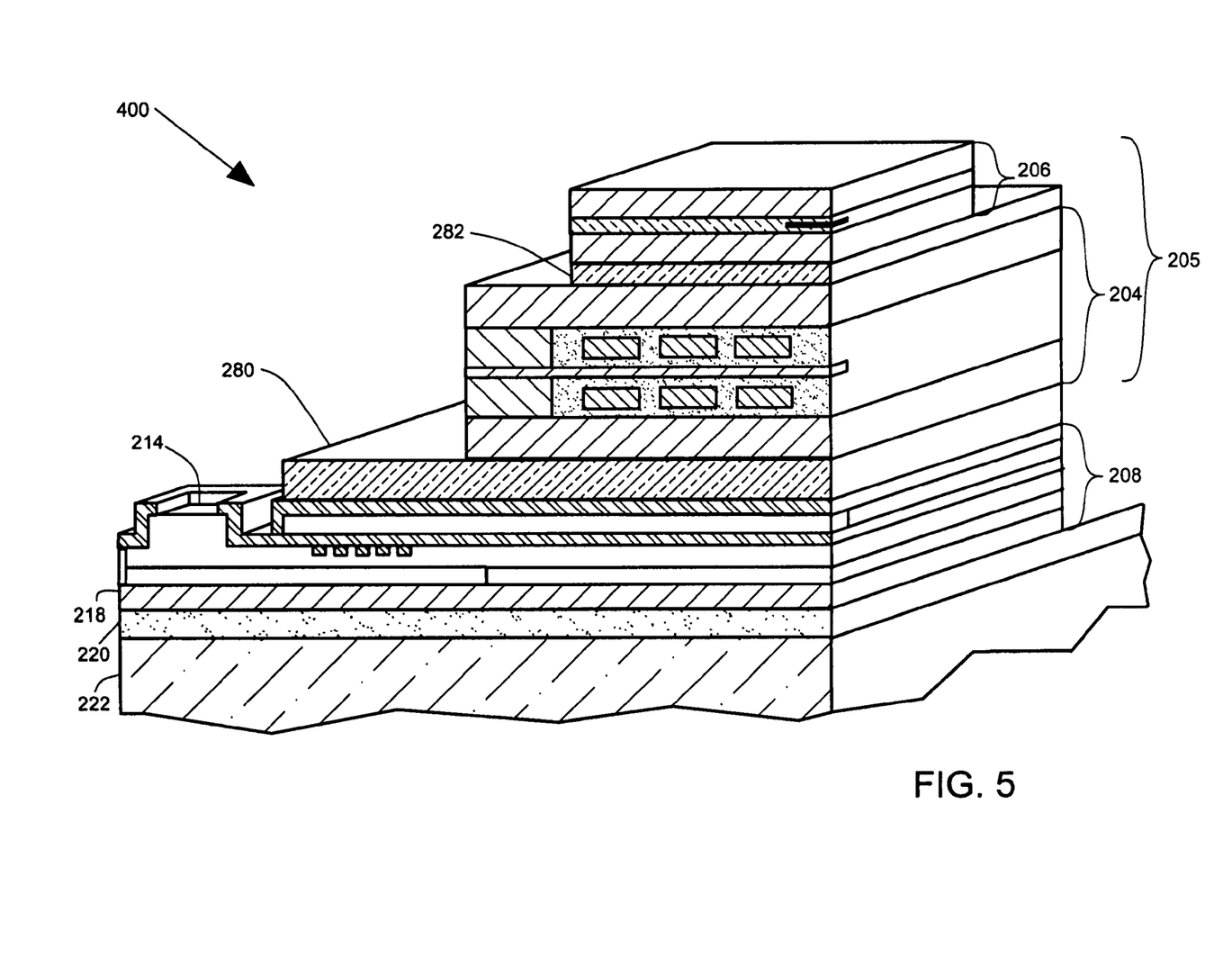
FIG. 5 illustrates an oblique view, cross-sections along a central plane, of a second embodiment of a HAMR head.

FIG. 5 illustrates an oblique view, cross-sectioned along a central plane, of a second embodiment 400 of a HAMR head. The embodiment 400 is similar to the embodiment 200 illustrated in FIGS. 2-3 except that the stacking order of the writer 204 and reader 206 in FIG. 5 are reversed in order relative to the stacking order of the write 204 and reader 206 in FIGS. 2-3. In other respects, the embodiments 200 and 400 are similar. Reference numbers used in FIG. 5 that are the same as reference numbers used in FIG. 2-3 refer to the same or similar features. The cross sectional area of successively stacked layers is preferably reduced in the downstream direction to provide a lower temperature in the reader layer 206 in FIG. 5.

The embodiment shown in FIG. 5 has the advantage that reader layers 206 are more remote from the optoelectronic layers 208 such that reader 206 can operate at a lower temperature than the optoelectronic heater 208. The embodiment shown in FIG. 5 also has the advantage that there is a shorter distance between the heater and the writer, a shorter time delay between heating and writing, and thus a smaller amount of heating can be used. The arrangement shown in FIGS. 2-3 has the advantage that the write layers 204 are more remote from the optoelectronic heater 208 such that the writer portion 204 can operate at a lower temperature than the optoelectronic heater 208.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular writer system used, while maintaining substantially the same functionality without departing from the scope and spirit of the present invention. In addition, although the preferred embodiment described herein is directed to a parabolic reflector system for heat assisted magnetic recording head, it will be appreciated by those skilled in the art that the teachings of the present invention can be applied to other recording heads with optical heating, without departing from the scope and spirit of the present invention.

What is claimed is:

1. An apparatus, comprising:
    a slider including a substrate with an air bearing surface and a trailing substrate side, and including an optoelectronic heater and a magnetic head mounted on the trailing substrate side;
    thermal insulation comprising a spacer layer interposed between the optoelectronic heater and the magnetic head; and
    a buffer layer thermally coupling the optoelectronic heater to the trailing substrate side, the buffer layer having a high thermal conductance relative to the thermal conductance of the spacer layer.

2. The apparatus of claim 1, wherein the magnetic head comprises a reader and a writer, the reader being disposed adjacent the spacer layer.

3. The apparatus of claim 1, wherein the thermal insulation inhibits heat flow from the optoelectronic heater to the magnetic head, reducing the temperature of the magnetic head.

4. The apparatus of claim 1, wherein the optoelectronic heater comprises a laser and a waveguide, the laser being disposed between the waveguide and the trailing substrate side.

5. The apparatus of claim 1, wherein the optoelectronic heater is disposed upstream of the magnetic head along an aerodynamic flow path adjacent the slider.

6. The apparatus of claim 1, wherein the optoelectronic heater has an upstream cross-sectional area and the magnetic head has a downstream cross-sectional area that is stacked on the optoelectronic heater in a downstream direction.

7. The apparatus of claim 6, and wherein the downstream cross sectional area is smaller than the upstream cross sectional area.

8. The apparatus of claim 1, wherein the spacer layer shields the entire side of the magnetic head facing the optoelectronic heater.

9. The apparatus of claim 1, wherein the optoelectronic heater comprises a parabolic waveguide that increases the power density of light emitted by the optoelectronic heater.

10. The apparatus of claim 1, wherein the buffer layer is formed of a material selected from the group consisting of a nitride (AlN), an oxide, a carbide of aluminum, magnesium, SiC, MgO, AlMgO, and AlMgN.

11. An apparatus, comprising:
    a slider including a substrate with an air bearing surface and a trailing substrate side, and including an optoelectronic heater disposed adjacent the trailing side and a magnetic head being mounted on the trailing substrate side, wherein the optoelectronic heater comprises a parabolic waveguide that increases the power density of light emitted by the optoelectronic heater;

thermal insulation interposed between the optoelectronic heater and the magnetic head, and the optoelectronic heater being disposed adjacent the trailing substrate side.

12. The apparatus of claim 11, wherein the magnetic head comprises a reader.

13. The apparatus of claim 11, wherein a first heat input to the optoelectronic heater is greater than a second heat input to the magnetic head.

14. The apparatus of claim 11, wherein:

the thermal insulation comprises a spacer layer that shields the entire side of the magnetic head facing the optoelectronic heater; and the apparatus comprises a buffer layer interposed between the optoelectronic heater and the substrate, the buffer layer having a high thermal conductance relative to the spacer layer.

15. The apparatus of claim 14, wherein the buffer layer is formed of a material selected from the group consisting of a nitride (AlN), an oxide, a carbide of aluminum, magnesium, SiC, MgO, AlMgO, and AlMgN.

16. The apparatus of claim 11, wherein the optoelectronic device comprises a laser diode.

17. An apparatus, comprising:

a slider substrate with a buffer layer on a trailing side thereof;

optoelectronic layers disposed adjacent the buffer layer, the optoelectronic layer being heated by a first electric current and heat sunk through the buffer layer to the slider substrate; and magnetic head layers disposed adjacent the optoelectronic layers and separated from the optoelectronic layers by a spacer layer that thermally insulates the entire side of the magnetic head layers facing the optoelectronic layers, the magnetic head layers being heated by a second electric current and heat sunk to an ambient, wherein the buffer layer has a high thermal conductance relative to the spacer layer.

18. The apparatus of claim 17, wherein the optoelectronic layers comprise a semiconducting material.

19. The apparatus of claim 17, wherein the optoelectronics layers comprise a light emitting diode.

20. The apparatus of claim 17, wherein the optoelectronics layers comprise a laser.

21. The apparatus of claim 20, wherein the optoelectronics layers comprise a parabolic mirror that increase power density of radiation emitted by the laser.

* * * * *

UNITED STATES PATENT AND TRADEMARK OFFICE
CERTIFICATE OF CORRECTION

| | | |
|---|---|---|
| PATENT NO. | : 7,609,480 B2 | Page 1 of 1 |
| APPLICATION NO. | : 11/480054 | |
| DATED | : October 27, 2009 | |
| INVENTOR(S) | : Shukh et al. | |

It is certified that error appears in the above-identified patent and that said Letters Patent is hereby corrected as shown below:

Column 6, line 40, change "." to --,--.

Column 6, line 43, change "." to --,--.

Signed and Sealed this

Twenty-sixth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,609,480 B2  Page 1 of 1
APPLICATION NO. : 11/480054
DATED : October 27, 2009
INVENTOR(S) : Shukh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 614 days.

Signed and Sealed this

Fourteenth Day of December, 2010

David J. Kappos
*Director of the United States Patent and Trademark Office*